(12) United States Patent
Zhou

(10) Patent No.: US 11,962,251 B2
(45) Date of Patent: Apr. 16, 2024

(54) HYBRID MODULAR MULTILEVEL CONVERTER (HMMC) BASED ON A NEUTRAL POINT PILOT (NPP) TOPOLOGY

(71) Applicant: GE Energy Power Conversion Technology Limited, Warwick (GB)

(72) Inventor: Zhi Zhou, Niskayuna, NY (US)

(73) Assignee: GE Energy Power Conversion Technology Limited, Warwickshire (GB)

(*) Notice: Subject to any disclaimer, the term of this patent is extended or adjusted under 35 U.S.C. 154(b) by 40 days.

(21) Appl. No.: 17/856,734

(22) Filed: Jul. 1, 2022

(65) Prior Publication Data
US 2023/0268846 A1 Aug. 24, 2023

Related U.S. Application Data

(60) Provisional application No. 63/313,271, filed on Feb. 23, 2022.

(51) Int. Cl.
*H02M 7/487* (2007.01)
*H02M 1/00* (2006.01)
*H02M 7/483* (2007.01)
*H02M 7/5387* (2007.01)

(52) U.S. Cl.
CPC ......... *H02M 7/487* (2013.01); *H02M 1/0095* (2021.05); *H02M 7/4835* (2021.05); *H02M 7/53871* (2013.01)

(58) Field of Classification Search
CPC .. H02M 7/487; H02M 7/4835; H02M 1/0095; H02M 7/53871
See application file for complete search history.

(56) References Cited

U.S. PATENT DOCUMENTS

| | | | |
|---|---|---|---|
| 10,075,056 B2 | 9/2018 | Zhang et al. | |
| 10,177,682 B2* | 1/2019 | Mondal | H02M 7/48 |
| 10,224,830 B2* | 3/2019 | Basic | H02M 1/143 |
| 11,515,807 B1* | 11/2022 | Liu | H02M 7/4835 |
| 2015/0036398 A1 | 2/2015 | Garces et al. | |
| 2018/0145600 A1* | 5/2018 | Zhou | H02J 1/10 |
| 2023/0268845 A1* | 8/2023 | Zhou | H02M 7/487 |
| | | | 363/132 |

FOREIGN PATENT DOCUMENTS

DE 102020108034 B3 4/2021
WO 2019238443 A1 12/2019

OTHER PUBLICATIONS

Adam et al. "Transient capability assessments of HVDC voltage source converters," 2012 IEEE Power and Energy Conference, 2012, pp. 1-8, doi: 10.1109/PECI.2012.6184600.
(Continued)

*Primary Examiner* — Adolf D Berhane

(57) ABSTRACT

Provided is a hybrid modular multilevel converter (HMMC) based on a neutral point pilot (NPP) topology and having an ABC N-phase structure. The HMMC includes N pairs of identical upper and lower arms, each upper and lower arm being composed of X submodules and Y sets of switches. The switches within each set are cascaded and connected in series, each of the submodules is formed of full-bridge silicon (Si) insulated-gate bipolar transistor (IGBT) converters, and at least one of the set of switches is formed of IGBTs of opposite polarities.

19 Claims, 12 Drawing Sheets

(56) References Cited

OTHER PUBLICATIONS

Davidson et al. "Innovative concepts for hybrid multi-level converters for HVDC power transmission," 9th IET International Conference on AC and DC Power Transmission (ACDC 2010), Oct. 19, 2010, pp. 1-5, doi: 10.1049/cp.2010.0982.

Extended European Search Report for EP Application No. 23156351.1 dated Jun. 27, 2023, 12 pages.

Extended European Search Report for EP Application No. 23156376.8 dated Jun. 30, 2023, 12 pages.

Liu et al. "A Hybrid Modular Multilevel Converter Family With Higher Power Density and Efficiency," IEEE Transactions on Power Electronics, Institute of Electrical and Electronics Engineers, USA, vol. 36, No. 8, Jan. 29, 2021 (Jan. 29, 2021), pp. 9001-9014, XP011854258, ISSN: 0885-8993, DOI: 10.1109/TPEL.2021.3055690.

Wang et al. "Power Electronics Building Block (PEBB) design based on 1.7 kV SiC MOSFET modules," 2017 IEEE Electric Ship Technologies Symposium (ESTS), IEEE, Aug. 14, 2017, pp. 612-619, XP033227819, DOI: 10.1109/ESTS.2017.8069345.

\* cited by examiner

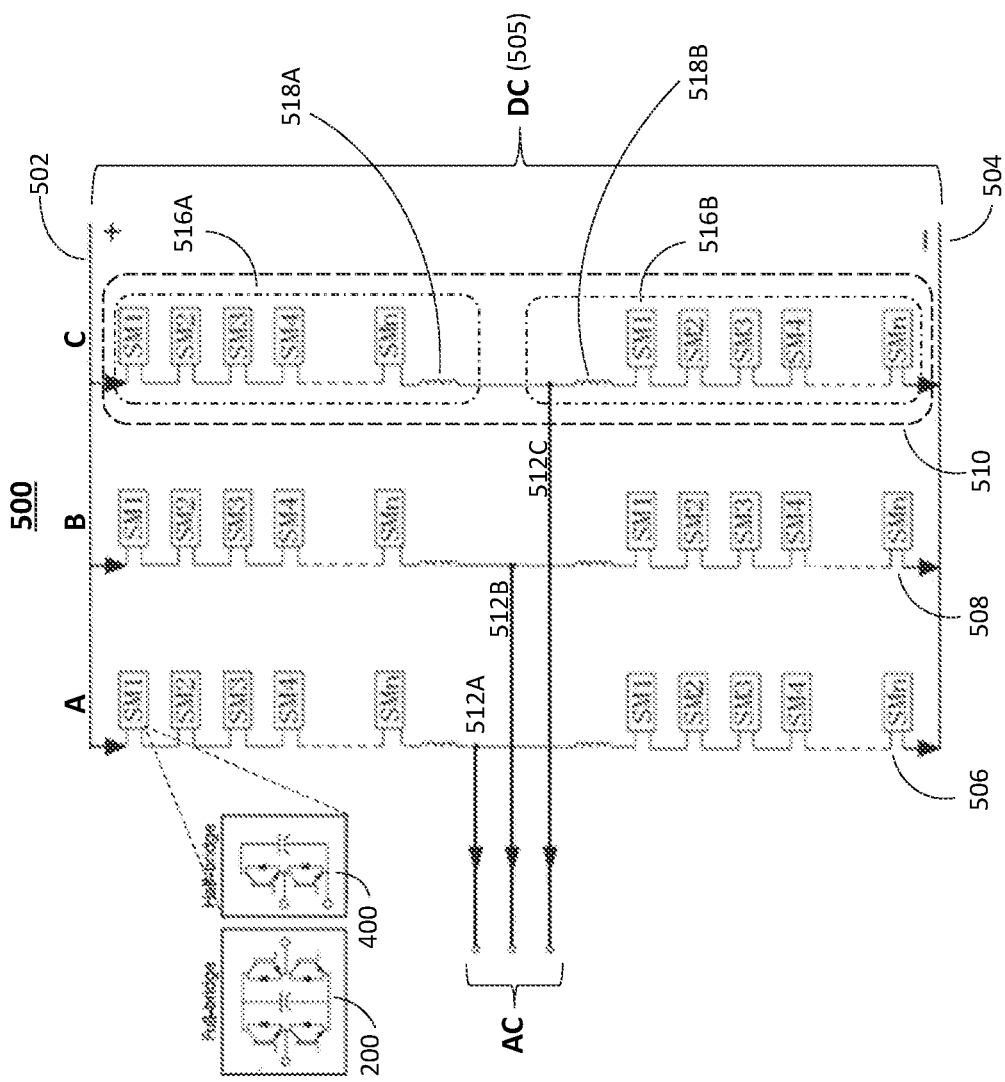
FIG. 5
(Conventional)

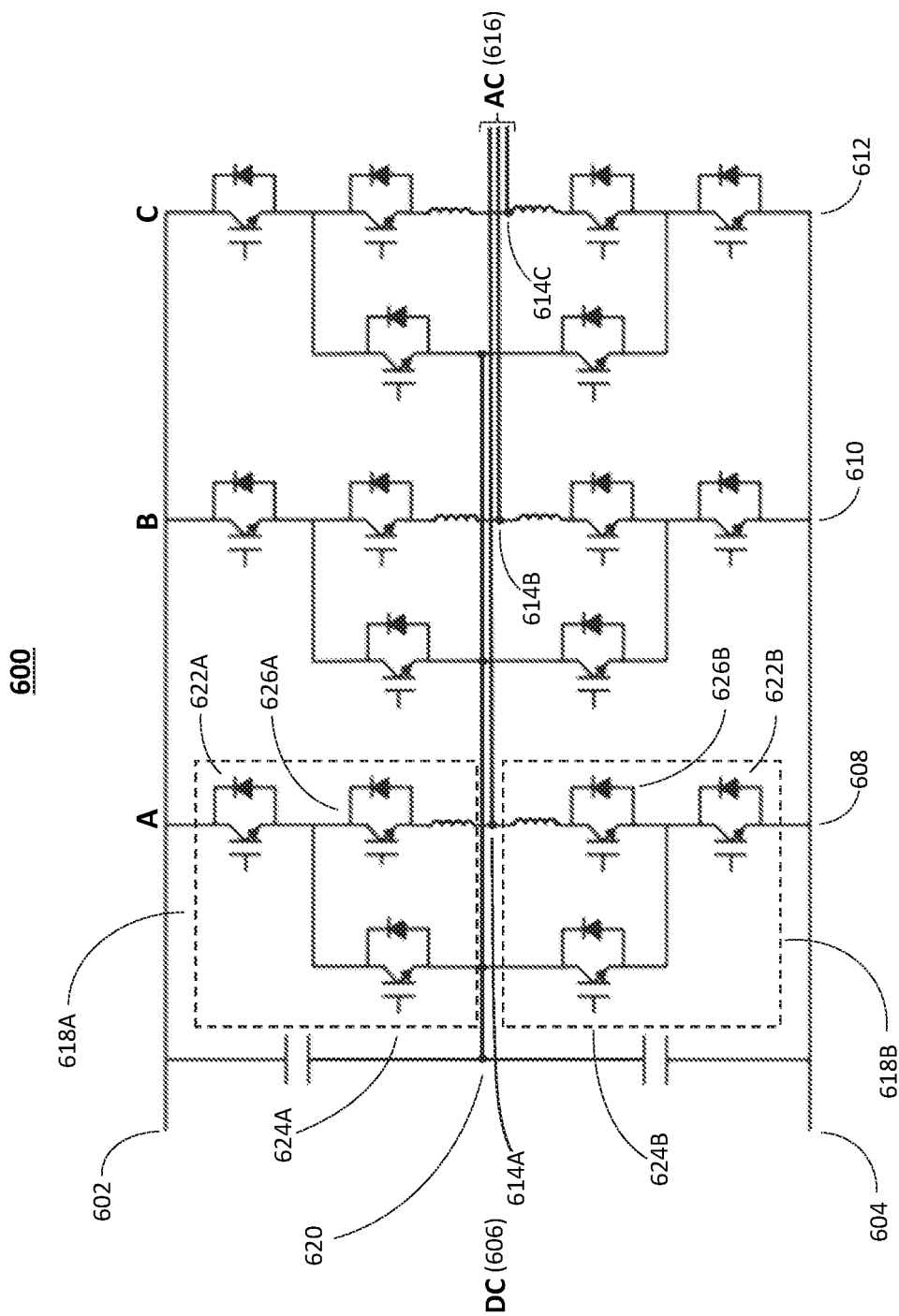
FIG. 6A
(Conventional)

HYBRID MODULAR MULTILEVEL CONVERTER (HMMC) BASED ON A NEUTRAL POINT PILOT (NPP) TOPOLOGY

CROSS REFERENCE TO RELATED APPLICATIONS

This application claims benefit to U.S. Provisional Patent Application No. 63/313,271, filed 23 Feb. 2022, and entitled "Hybrid MMC Built-/Based-On Three Level NPP with FB-SMS Capable of Variable (Lower) DC Link (than AC) Voltage and DC Link Short-Circuit Protection," the disclosure of which is incorporated herein in its entirety by reference.

FIELD OF TECHNOLOGY

The following disclosure relates generally to modular multilevel converters (MMCs) based on neutral point pilot (NPP) or neutral point clamped (NPC) topologies.

BACKGROUND

Traditional MMCs are modular and scalable and remove the technical barriers for scaling up power converters to higher voltage and higher power applications. Additionally, MMCs provide a convenient pathway to improve power quality by increasing the number of levels of conversion.

By way of example, and as understood by those of skill in the art, 2-level converters are considered the fundamental MMC building block. For higher voltage and power quality applications, the levels of conversion can be increased (beyond two-levels) depending on the levels of voltage requiring manipulation, or how many waveforms will be superimposed together to produce a desired waveform, or power quality.

In general, the higher the number of levels of conversion, the higher the power quality performance. The classical state-of-the-art typically includes a 2-level, a 3-level, or a 5-level converter. Increasing the number of levels of conversions provides more flexibility to create better waveforms with minimal filtering and post-processing.

Five levels of conversion are typically produced using a combination of a 2-level and a 3-level converter, or two 3-level converters together. Conventionally, insulated-gate bipolar transistor (IGBT) devices are used as modules (discussed in greater detail below), combinable and scalable to produce the desired levels of conversion. This concept is the foundation of the traditional MMC.

One disadvantage, however, for higher voltage and better quality power applications is that the traditional MMC has a larger footprint/volume, more weight, and is more expensive due to the higher number of submodules (SMs) used. For stationary utility or electric power grid applications, the larger volume and heavier weight may not be problematic. However, for motive applications (e.g., marine propulsion), volume, weight, and power density are critical requirements in addition to the cost.

SUMMARY OF THE EMBODIMENTS

Given the foregoing deficiencies, systems and methods are needed for a hybrid MMC (HMMC) for reducing footprint/volume, weight, and costs compared with traditional MMC solutions. Such methods and systems should maintain the modularity, scalability, and power quality performance of the traditional MMC.

In certain circumstances, an embodiment includes an HMMC based on an NPP topology and having an ABC N-phase structure. The HMMC includes N pairs of identical upper and lower arms, each upper and lower arm being composed of X submodules and Y sets of switches. The switches within each set are cascaded and connected in series, each of the submodules is formed of full-bridge silicon (Si) IGBT converters, and at least one of the set of switches is formed of IGBTs of opposite polarities.

The embodiments provide an HMMC built on a three-level neutral point pilot (3-level NPP) converter topology, capable of lower DC link voltage than the AC source/input voltage and with DC link short circuit isolation protection. The lower DC link voltage is provided via a unique HMMC active front-end (AFE) built on the 3L-NPP converter topology using full-bridge submodules (FB-SMs). Also used is a pair of cascaded IGBTs in series with opposite polarities.

HMMCs constructed in accordance with the embodiments reduce volume, weight, and cost compared with traditional MMC solutions while maintaining the modularity, scalability, and power quality performance of the traditional MMC.

The embodiments overcome the challenges associated with larger volume, heavier weight and higher cost associated with traditional MMC. The embodiments hybridize the traditional MMC SMs with 3L-NPP converter topology and component/subsystem technology.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 5 illustrates a block diagram of a conventional 2-level MMC.

FIG. 6A illustrates a block diagram of a conventional 3-level active neutral-point clamped (ANPC) MMC.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
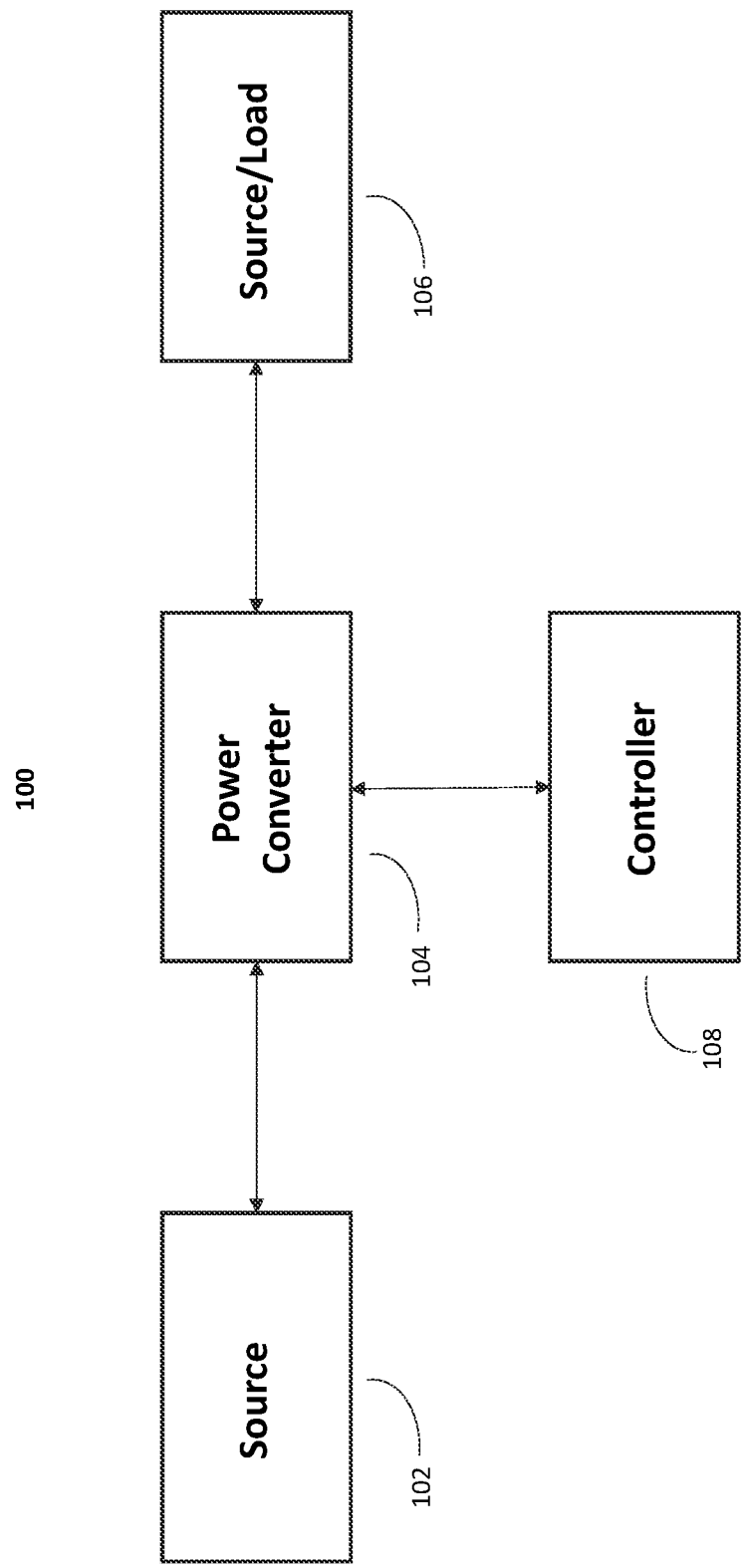
FIG. 1 illustrates a block diagram of an exemplary system for performing power conversion in accordance with embodiments of the present disclosure.

FIG. 1 includes a system 100 for converting power. In one embodiment, the system 100 includes a source 102, a power converter 104, and a source/load 106. The term source, as used herein, refers to a renewable power source, a non-renewable power source, a generator, a grid, a fuel cell, an energy storage (when discharged), and the like. Also, the term load, as used herein, may refer to a motor, an electrical appliance, an energy storage (when re-charged) and the like.

In addition, the power converter 104 may be a multilevel converter. In one embodiment, the source 102 may be operatively coupled to a first terminal (not shown) of the power converter 104. A second terminal (not shown) of the power converter 104 may be operatively coupled to the source/load 106. The first terminal and the second terminal may be alternatively employed as an input terminal or an output terminal of the power converter 104.

The system 100 further includes a controller 108. The controller 108 is configured to control the operation of the power converter 104, the embodiments. By way of example only, and not limitation, the controller 108 may be configured to control the operation of the power converter 104 by controlling switching of a plurality of semiconductor switches and submodules (SMs) within the power converter 104.

By way of background, and as noted above, 2-level converters are a fundamental component of MMCs. As the number of levels of conversion increase, a 3-level converter or a 5-level converter can be used, depending on the required number of levels of voltage. For example, to achieve 7, 9, 10 levels or more, true converter modularity is required. Such modularity is traditionally achieved using a building block called a submodule (SM).

A SM can be implemented using a full-bridge (FB) converter. The FB converter includes four semiconductor switches and a smoothing capacitor for energy storage/buffer/filter. A SM may also be implemented using a half-bridge (HB) converter, including two semiconductor switches.

Figure 2B:
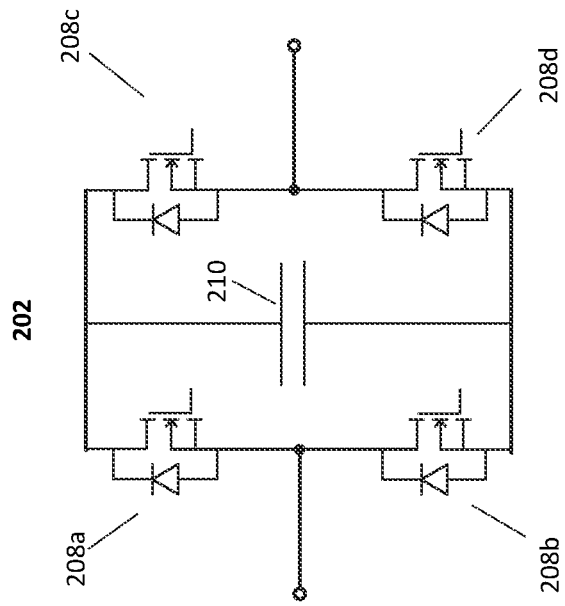
FIG. 2B illustrates a block diagram of an exemplary FB-SM with silicon carbide (SiC) metal oxide semiconductor field effect transistors (MOSFETs) in accordance with the embodiments.
Figure 2A:
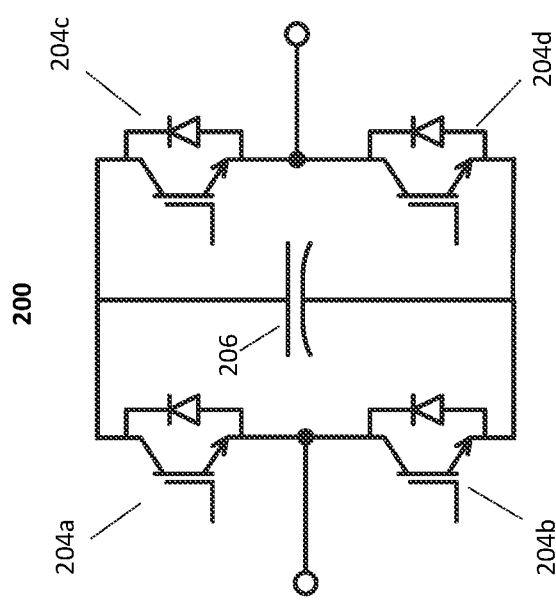
FIG. 2A illustrates a block diagram of an exemplary FB-SM with silicon (Si) IGBTs in accordance with the embodiments.

FIG. 2A is a block diagram of an exemplary 2-level FB-SM 200 in accordance with the embodiments. The exemplary 2-level FB-SM 200 of FIG. 2A includes semiconductor switches 204a-204d and a smoothing capacitor 206. In one embodiment, the switches 204a-204d are formed of Si IGBTs.

FIG. 2B is a block diagram of an exemplary 2-level FB-SM 202 based on SiC MOSFETs. The 2-level FB-SM 202 includes SiC MOSFET switches 208a-208d and a smoothing capacitor 210.

The HMMC topology facilitates use of low voltage FB-SMs. Consequently, SiC MOSFETs of 1.7 kilovolts (kV) ratings, as one example, become a viable option. Other viable options include IGBTs with various voltage ratings. For example, in other embodiments of the present disclosure, the semiconductor switches (e.g., 204a-204d) may be formed of field effect transistors (FETs), injection enhanced gate transistors (IEGTs), gallium nitride based switches, gallium arsenide based switches, or equivalents thereof.

The use of FB-SMs provides not only isolation protection in case of a DC link short circuit fault, but also the option of superimposing negative, or subtracting (SM capacitor) voltages, to obtain a lower DC link voltages than AC input voltages. By way of example, when the IGBTs are in the OFF state, the two IGBTs in series of opposite polarities will block the higher AC voltages from feeding-back to the DC link, which can cause control stability issues.

Figure 3:
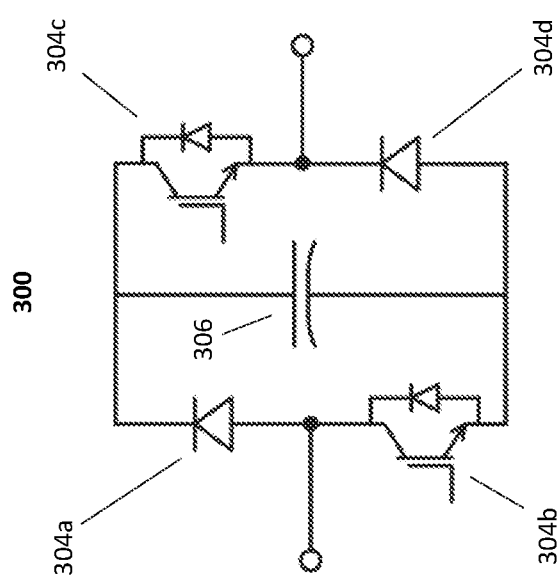
FIG. 3 illustrates a block diagram of an exemplary hybrid FB-SM (HFB-SM) with Si IGBTs in accordance with the embodiments.

FIG. 3 is a block diagram of an exemplary 2-level hybrid FB-SM (HFB-SM) 300 with Si IGBTs in accordance with the embodiments. The HFB-SM 300 includes semiconductor switches 304a-304d, along with a smoothing capacitor 306. The switches 304a-304d are formed of mixed diodes with Si IGBTs or with SiC MOSFETs (not shown in FIG. 3). As in the case of FIGS. 2A and 2B above, both options can be used as SMs. Various other embodiments and alternatives are discussed in greater detail below.

As noted earlier, SM semiconductor switches can be implemented as FBs or HBs. For example, the FB-SM 200 can be implemented as a HB-SM by removing the right hand side of the FB-SM 200 of FIG. 2A. The right hand side of the FB-SM 200 essentially forms exemplary 2-level HB-SM 400, illustrated in FIG. 4A. That is, the HB-SM 400 can be implemented with the Si IGBT semiconductor switches 204a-204b and the capacitor 206 of the FB-SM 200 of FIG. 2A.

Figure 4B:
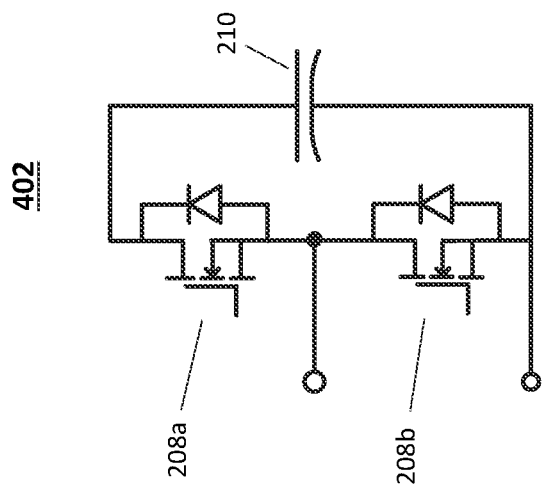
FIG. 4B illustrates a block diagram of an exemplary HB-SM with SiC MOSFETs in accordance with the embodiments.
Figure 4A:
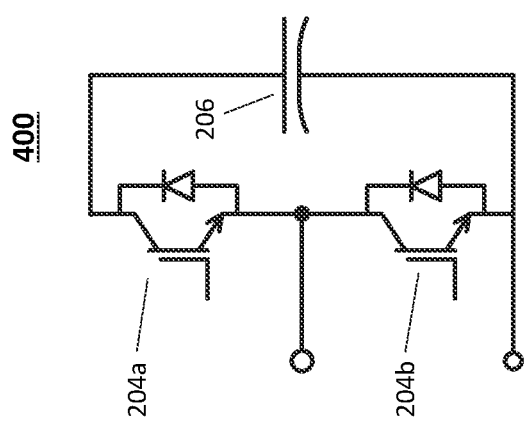
FIG. 4A illustrates a block diagram of an exemplary half-bridge SM (HB-SM) with Si IGBTs in accordance with the embodiments.

In the same manner, FIG. 4B is a block diagram of an exemplary 2-level HB-SM 402 implemented using the right hand side SiC MOSFETs switches of the FB-SM 202. That is, the HB-SM 402 can be implemented with the semiconductor switches 204a-204b and the capacitor 206 of the FB-SM 202 of FIG. 2B.

Various combinations of the 2-level SMs depicted in FIGS. 2A-4B can be connected in series to produce any desirable number of conversion levels in a conventional MMC. FIG. 5 is a block diagram of a conventional, or classical, 2-level MMC 500, as described, using a plurality of 2-level SMs connected in series.

In FIG. 5, the classical MMC 500 has an ABC 3-phase structure including positive and negative DC voltage rails 502 and 504, respectively. The positive and negative rails 502 and 504 form DC terminals 505. Each of the 3-phases (A, B, and C) corresponds to one of phase legs 506, 508, and 510. The phase legs 506, 508, and 510 are connected to AC terminals 512A, 512B, and 512C, respectively.

By way of example, the phase leg 510 includes an upper arm 516A and an identical lower arm 516B. In the example of FIG. 5, the upper and lower arms (516A and 516B) are connected together at one lead to the AC terminal 512C, and respectively include arm inductors 518A and 518B for current suppression. The upper and lower arms 516A and 516B are connected, at opposing leads, to the positive and negative rails 502 and 504, respectively.

The discussion regarding the phase leg 510 equally applies to the phase legs 506 and 508. The upper and lower arms of each phase leg 506, 508, and 510 include serially connected 2-level submodules SM1-SMn. Each of the 2-level submodules SM1-SMn is either a full-bridge converter (e.g., the FB-SM 200 of FIG. 2A) or a half-bridge converter (e.g., the HB-SM 400 of FIG. 4A).

In the MMC 500, to increase the number of levels of conversion, the number of series connected SMs can be increased. That is, more SMs can be added to provide better and finer power quality waveforms. Accordingly, to satisfy different converter requirements, a designer only needs to choose the proper number of SMs to build the MMC into a larger converter with higher voltage, higher power, and better power quality performance.

Problematically, however, as more SMs are used in MMCs to achieve more levels, there are corresponding increases in cost, weight, and footprint or size. For stationary MMC applications, such as electric grid, these drawbacks have little impact.

For the electric grid applications, for example, there is usually sufficient physical space to accommodate more essential equipment components and applicable line replaceable units (LRUs). On the other hand, in marine propulsion, aviation, and similar motive applications, weight and volume are critical considerations.

The embodiments of the present disclosure overcome the challenges of larger volume, heavier weight and higher costs associated with conventional MMCs by hybridizing the conventional MMC SMs using 3-level NPP or 3-level NPC converter topology.

More particularly, the embodiments provide a novel HMMC topology approach that includes a mixture of both controllable semiconductor switches and submodules within each of the phase arms of 3-level NPP or a 3-level NPC MMC. For example, instead of using submodules in a 2-level traditional MMC including 100% submodules, the embodiments use a 3-level base structure MMC. Each of the corresponding upper and lower arms of each phase include a suitable mixture of semiconductor switches and submodules (e.g., 50% switches and 50% submodules).

FIG. 6A is a block diagram of a conventional 3-level active neutral-point clamped (ANPC) converter 600. The ANPC converter 600 is provided as an introduction to the novel HMMC topology disclosed herein.

The ANPC converter 600 includes an ABC 3-phase structure including positive and negative DC voltage rails 602 and 604, respectively. The positive and negative rails 602 and 604 form DC terminal 606. Each of the 3-phases (A, B, and C) includes a corresponding phase leg 608, 610, and 612. The phase legs 608, 610, and 612 are connected to AC terminals 614A, 614B, and 614C, respectively and form an AC side 616. The ANPC converter 600 includes a DC midpoint node 620.

The phase leg 608 includes upper and lower arms 618A and 618B, along with arm inductors 619A and 619B, respectively. By way of example, the upper arm 618A includes one switch 622A, and another switch 624A for actively controlling and connecting to the midpoint node 620. Also included is a third switch 626A. Being symmetrical to the upper arm 618A, the lower arm 618B includes switches 622B, 624B, the 626B.

Figure 6B:
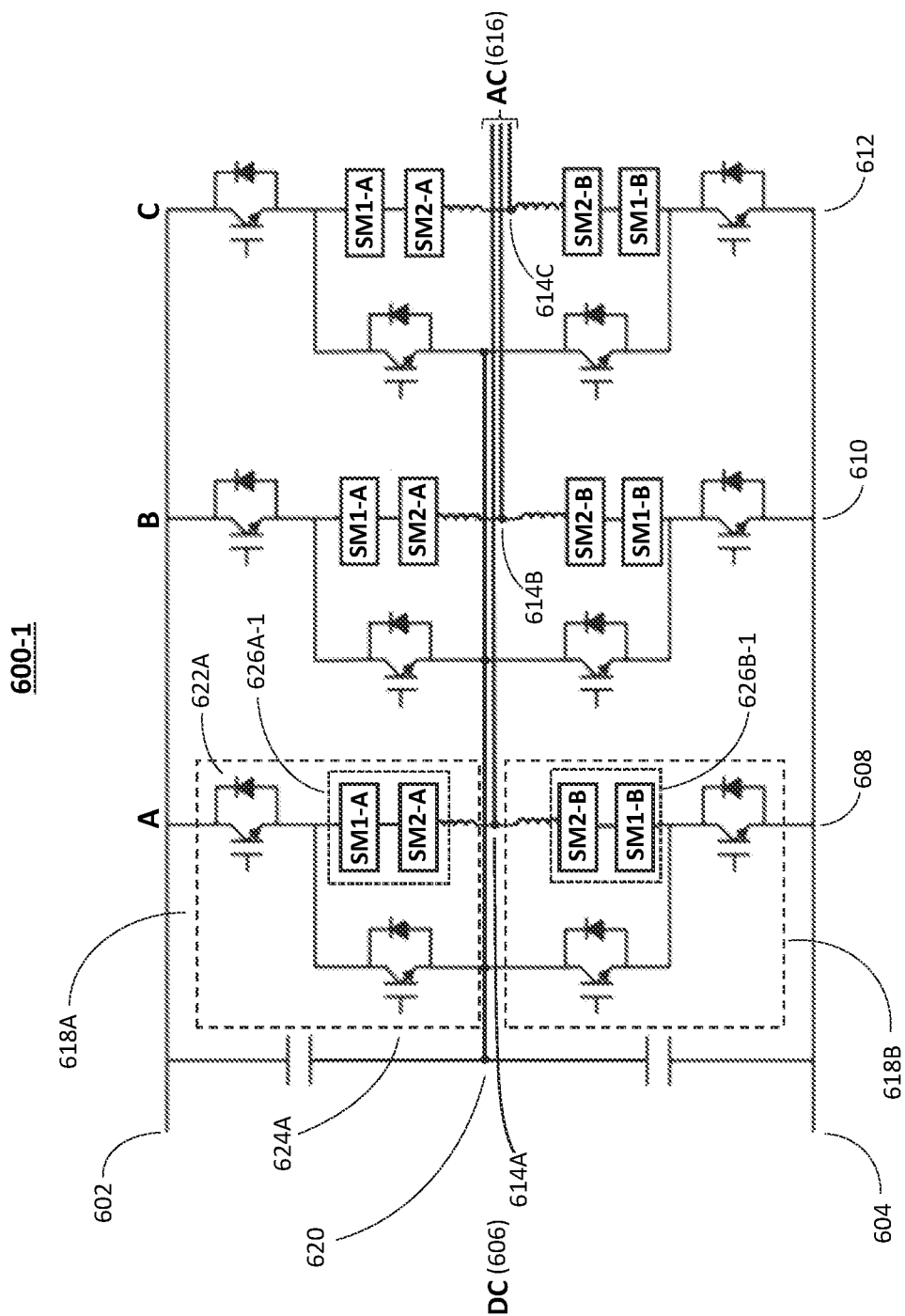
FIGS. 6B-6D illustrate block diagrams of a 3-level ANPC MMC replacing switches with submodules, in accordance with various embodiments of the present disclosure.
Figure 6C:
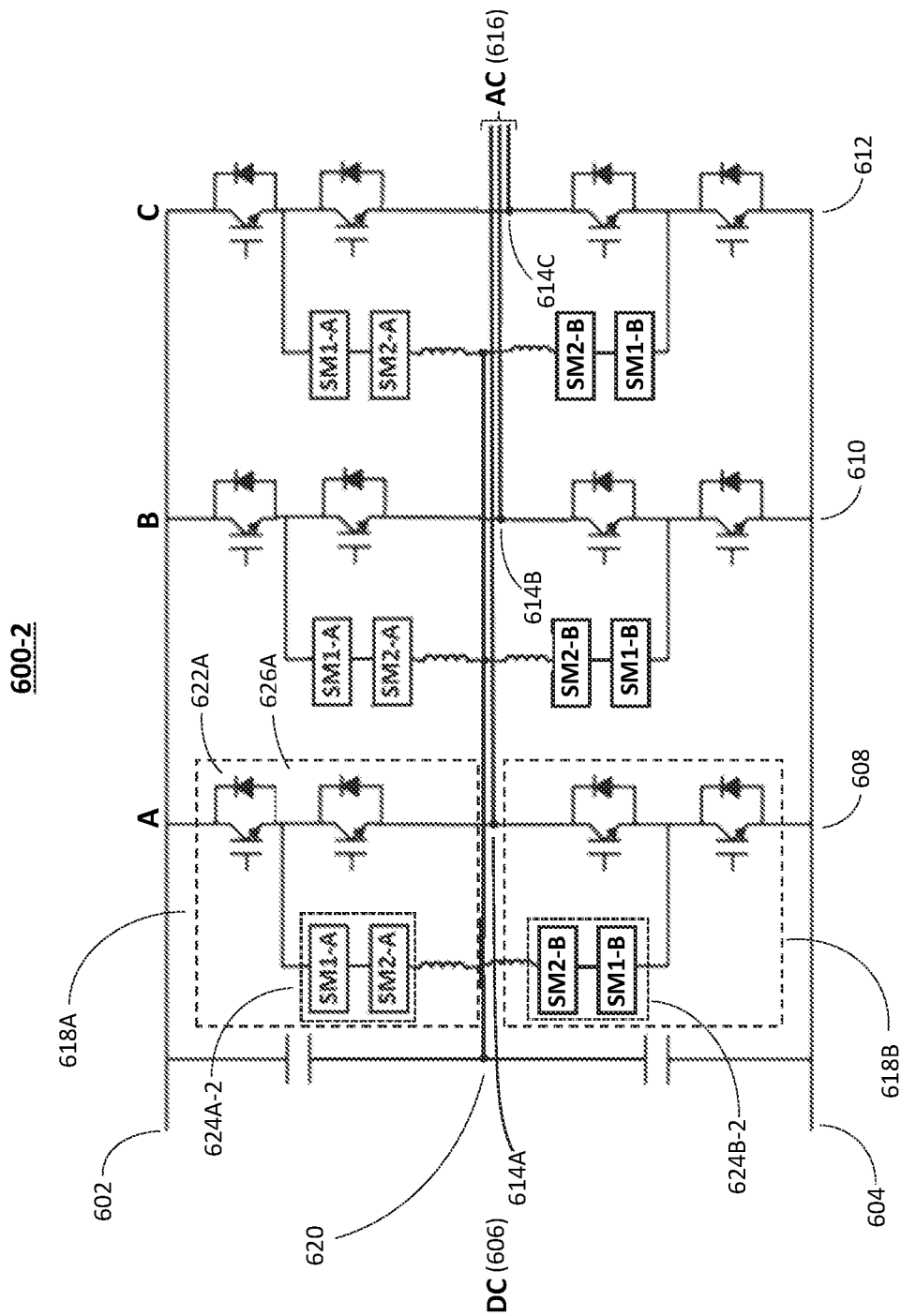
Figure 6D:
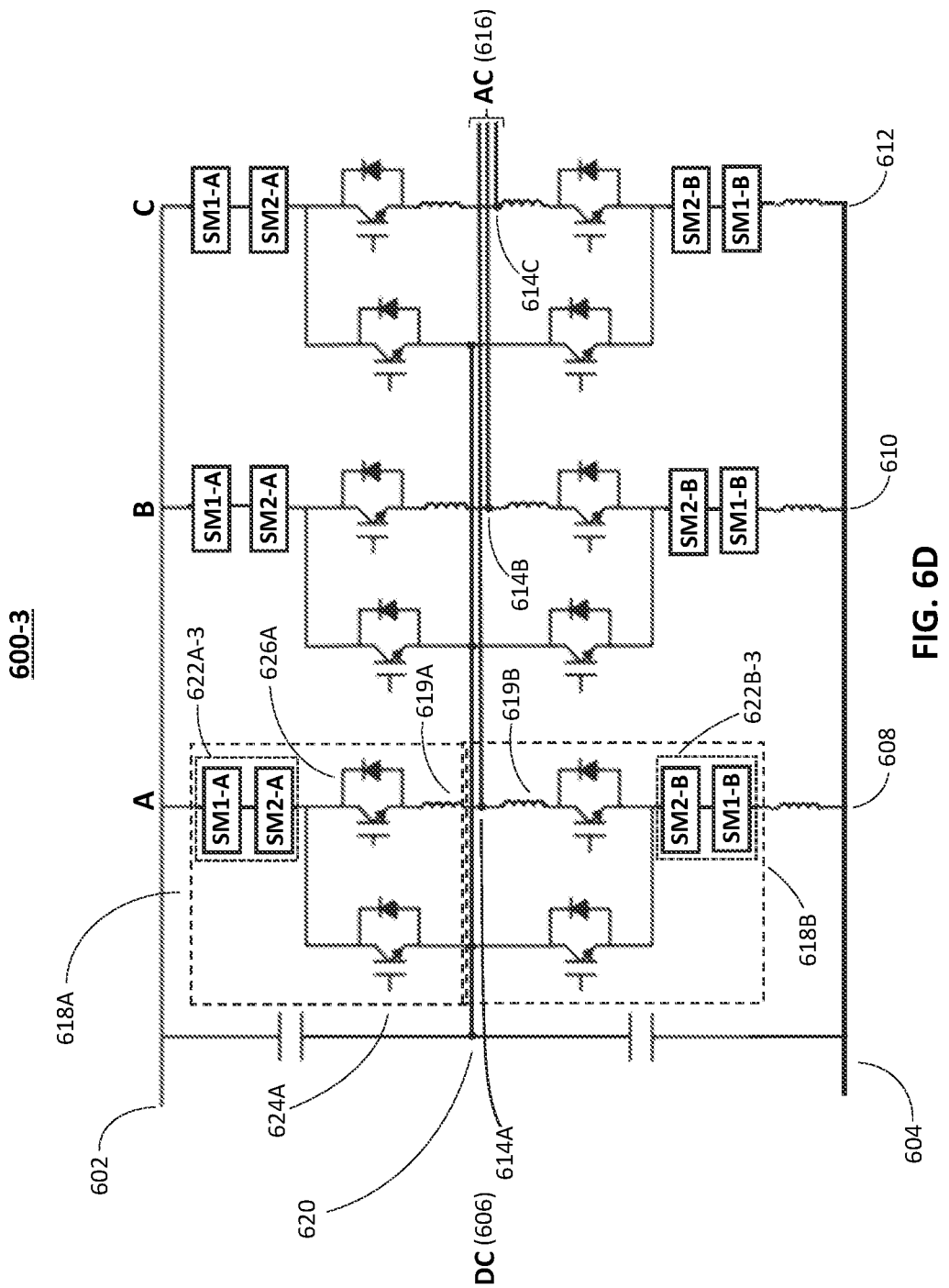

In the 3-level ANPC converter 600, based upon the HMMC topology of the embodiments, the switches in the upper arm 618A and the lower arm 618B can be replaced by one or more SMs, as depicted in the embodiments of FIGS. 6B-6D. HMMCs constructed in this manner reduce volume, weight, and cost in comparison to traditional MMC solutions, while maintaining the modularity, scalability, and power quality performance of the traditional MMCs.

As an example, in the embodiment of FIG. 6B, an HMMC 600-1 replaces the switch 626A in the upper arm 618A of the phase leg 608 (FIG. 6A) with a pair of SMs 626A-1 comprising SM1-A and SM2-A. Similarly, the lower arm 618B replaces the switch 626B with a pair of SMs 626B-1 comprising SM1-B and SM2-B. The remaining phase legs 610 and 612 are symmetrical to the phase leg 608 and reflect a corresponding replacement of individual switches with submodules. For purposes of modularity uniformity, SMs within arrangements, such as SM1-A and SM2-A within the pair of SMs 626A-1, are typically substantially equal values. However, certain embodiments may necessitate that SM1-A and SM2-A, or other SMs within similar arrangements, be of unequal (e.g., mixed) values.

In the embodiment of FIG. 6C, an exemplary HMMC 600-2 replaces the switch 624A in the upper arm 618A of the phase leg 608 (FIG. 6A) with a pair of SMs 624A-2 comprising the SM1-A and the SM2-A. Similarly, the lower arm 618B replaces the switch 624B with a pair of SMs 624B-2 comprising the SM1-B and the SM2-B. The remaining phase legs 610 and 612 are symmetrical to the phase leg 608 and reflect a corresponding replacement of individual switches with submodules.

In the embodiment of FIG. 6D, an exemplary HMMC 600-3 replaces the switch 622A in the upper arm 618A of the phase leg 608 (FIG. 6A) with a pair of SMs 622A-3 comprising the SM1-A and the SM2-A. Similarly, the lower arm 618B replaces the switch 622B with a pair of SMs 622B-3 comprising the SM1-B and the SM2-B. The remaining phase legs 610 and 612 are symmetrical to the phase leg 608 and reflect a corresponding replacement of individual switches with submodules.

Figure 7A:
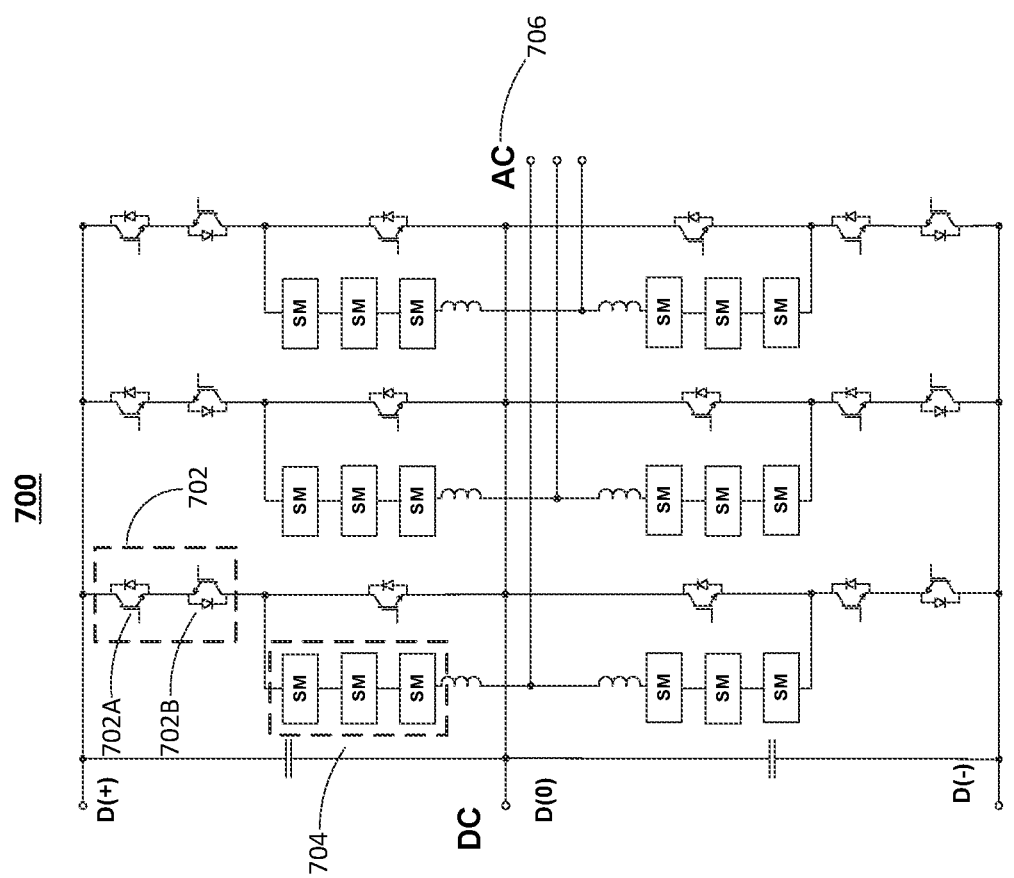
FIG. 7A illustrates a block diagram of a 3-level ANPC based HMMC using opposite polarity anti-blocking switches, in accordance with the embodiments.

FIG. 7A illustrates a block diagram of yet another embodiment of the present disclosure. In FIG. 7A, a 3-level ANPC HMMC 700 replaces a single switch, such as one of the switches 622A, 624A, and 626A of FIG. 6A, with two anti-blocking switches connected in series and of opposite polarity. For example, the ANPC HMMC 700 includes an anti-blocking pair 702 of switches 702A and 702B that are of opposite polarity, connected in series. An advantage of this configuration is that if submodules 704 are half-bridge, the switches 702A and 702B, being of opposite polarity, provide short circuit isolation protection by blocking higher voltages from AC side 706 from feeding-back to the DC link.

Figure 7B:
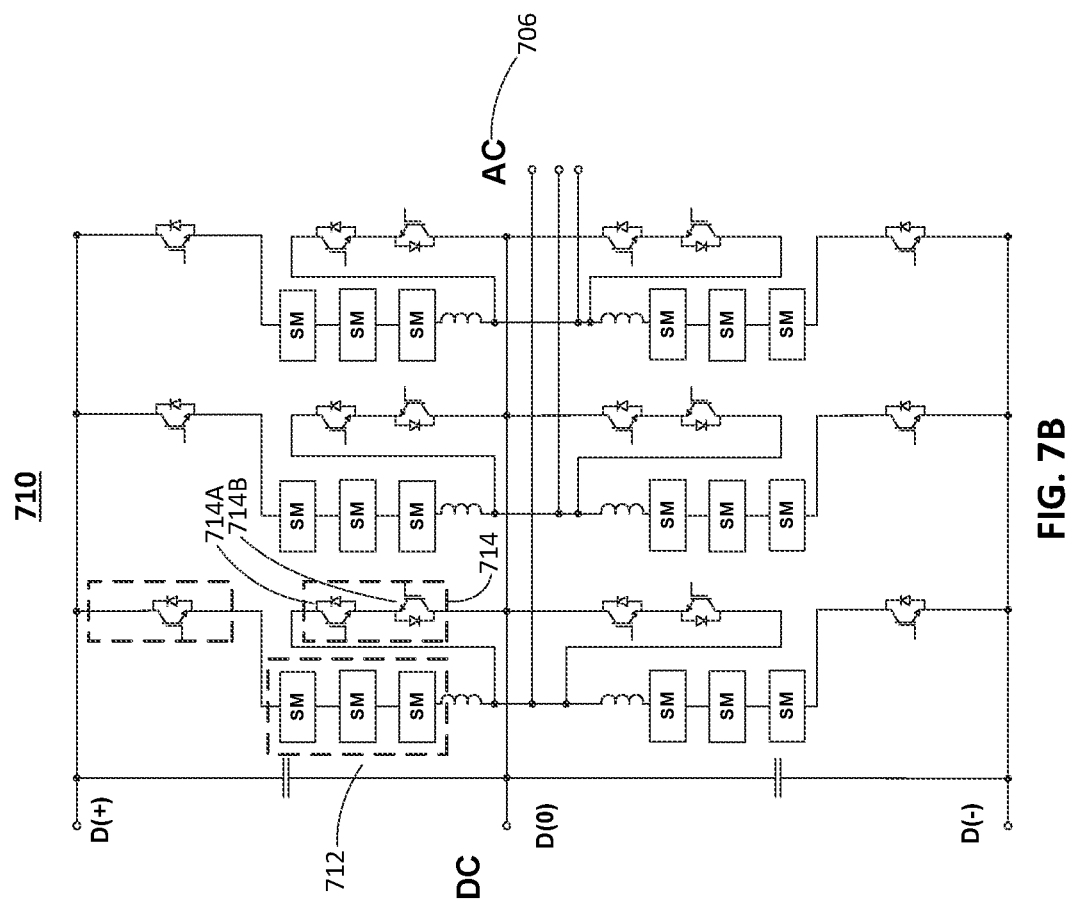
FIG. 7B illustrates a block diagram of a 3-level NPP based HMMC using opposite polarity anti-blocking switches, in accordance with the embodiments.

By way of introduction and focus on NPP concepts, FIG. 7B illustrates a block diagram of a further embodiment of the present disclosure. The embodiment of FIG. 7B, using an NPP HMMC 710, provides similar isolation functionality to the ANPC HMMC 700 of FIG. 7A. For example, the NPP HMMC 710 includes an anti-blocking pair 714 of switches 714A and 714B that are of opposite polarity and are connected in series, in accordance with the embodiments. As achieved in the ANPC converter 700 of FIG. 7A, the NPP HMMC 710 is also configured to block higher voltages from AC side 706 from feeding-back to the DC link if SMs 712 are HB-SMs.

Figure 7C:
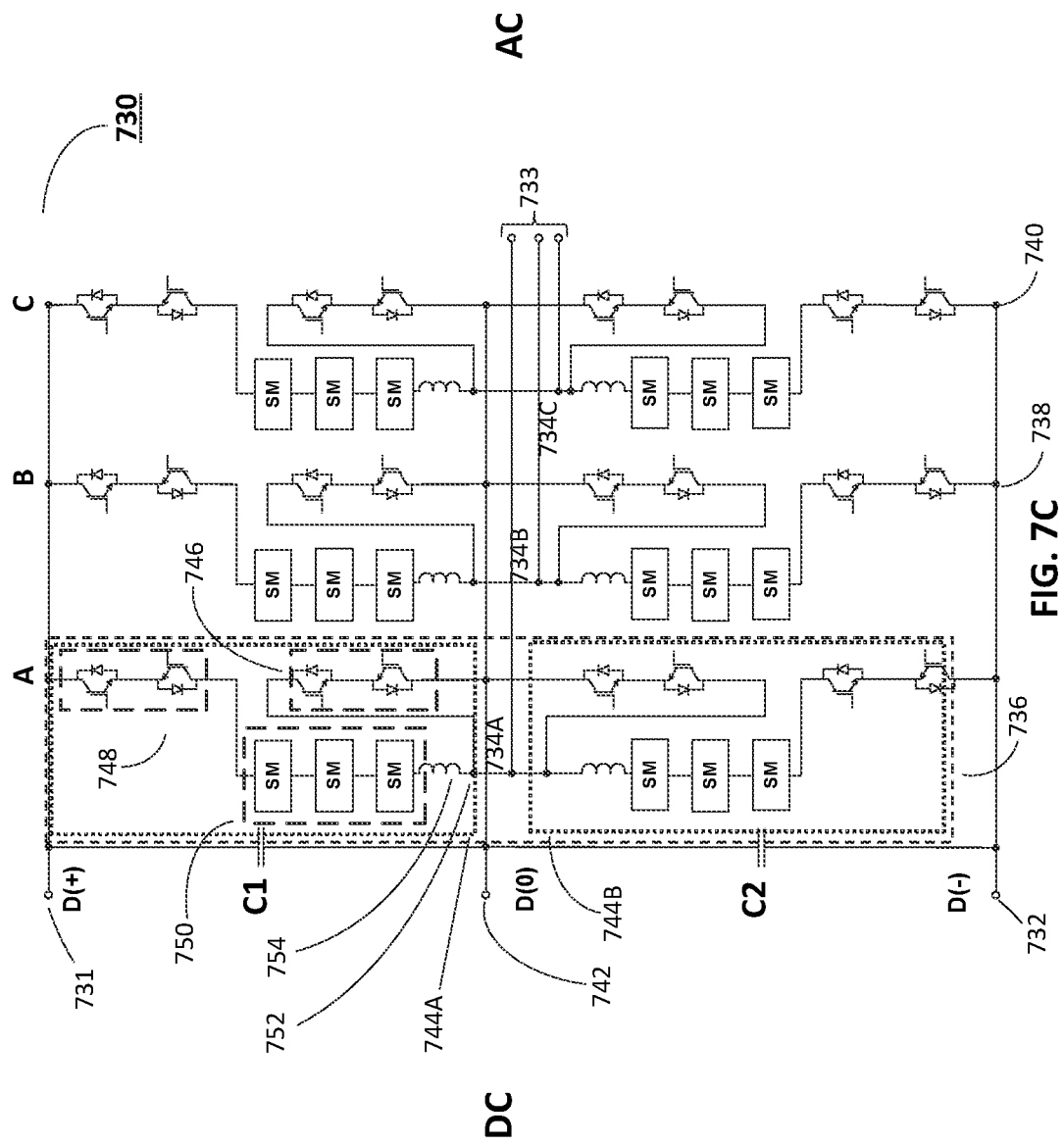
FIG. 7C illustrates a detailed block diagram of a 3-level NPP based HMMC using anti-blocking switches in each phase arm branch, in accordance with the embodiments.

FIG. 7C illustrates a detailed block diagram of a 3-level NPP HMMC 730 that shares similarities with the NPP converter 710 of FIG. 7B. However, as described in greater detail below, the NPP HMMC 730 provides an anti-blocking pair of switches on both branches of the phase arm. Therefore, by using anti-blocking switches, the NPP HMMC 730 also provides blocking of a short circuit of the DC link when the SM are HB-SMs.

For purposes of convenience only, and not limitation, anti-blocking switches were only illustrated in FIGS. 7A-7C. However, it is noted that the concept of using anti-blocking switches to prevent higher voltages from the AC side from feeding-back to the DC link applies equally to the exemplary embodiments of FIGS. 6B-6D.

Additionally, the 3-level NPP HMMC 730 includes a mixture of both switches and SMs within all the upper and lower arms of its phase legs. That is, in the HMMC 730 only a portion (e.g., 30%, 40%, 50% etc.) of the semiconductor switches used in an equivalent multilevel converter, are replaced by SMs.

The mixture of semiconductor switches and SMs (i.e., HMMC topology) depicted in the embodiment of FIG. 7C provides many of the beneficial characteristics of classical MMCs, including modularity. However, the exemplary NPP HMMC 730 is smaller by volume, is lighter in weight, and lower in cost than the classical MMC, but can achieve the same or better power quality performance.

The exemplary HMMC 730 of FIG. 7C includes positive 731 and negative 732 DC voltage rails. An AC side 733 includes AC output terminals 734A, 734B, and 734C that correspond to AC phases A, B, and C, respectively. AC phase legs 736, 738, and 740 also respectively correspond to the AC phases A, B, and C and are electrically coupled to a neutral point 742. Although the ABC structure of the HMMC 730 shows three AC phases, the embodiments may apply to systems including (N) AC phases.

The phase legs 736, 738, and 740 are connected between the positive and negative rails 731 and 732. Each of the phase legs 736, 738, and 740 includes an upper arm and a lower arm. For example, the phase leg 736 includes an upper arm 744A and a lower arm 744B. Although the discussion below focuses on the upper arm 744A, the concepts discussed apply equally to the lower arm 744B, as well as the upper and lower arms of the phase legs 738 and 740.

The HMMC 730 includes DC link capacitors C1 and C2. Leads of each of the capacitors C1 and C2 are connected together and to the neutral point 742. Opposite leads of the capacitors C1 and C2 are connected to the positive and negative rails 731 and 732, respectively.

As depicted in FIG. 7C, the upper arm 744A includes a first pair of semiconductor switches 746 that are cascaded and connected series, preferably of opposite polarity. One lead of the switch pair 746 is coupled the AC voltage terminal 734A and the other lead is connected to the neutral point 742. The upper arm 744A also includes a second pair of semiconductor switches 748 depicted with opposite polarities. Although the semiconductor switches 748 are shown with opposite polarity, the embodiments are not so limited. An open lead of the switch pair 748 is coupled to the positive rail 731.

The upper arm 744A also includes a plurality of series connected SMs 750, thus introducing the hybrid approach of mixing of SMs and semiconductor switches within the upper and lower arms of an MMC phase leg. In various embodiments, the SMs 750 may be HB-SMs. One lead of the series connected SMs 750 is coupled to a lead of the switch pair 748, with the other lead being coupled to an arm inductor 754. The other lead of the arm inductor 754 is coupled to the AC terminal 734A.

In the example of FIG. 7B, the SMs 750 can be full-bridge or half-bridge topology. By way of example, if the SMs 750 are HB-SMs, the switches 748 will preferably be of opposite polarities to provide the blocking capability and fault isolation, noted above.

The SMs 750, having FB-SMs, provide several advantages over HB-SMs. For example, FB-SMs provides the flexibility of achieving a true variable DC link voltage. That is, in a typical AC-to-DC converter, the DC side usually has a higher voltage level than the AC side. Usually, the relationship between the phase to neutral voltage ($V_{phase}$) on the AC side, and the DC link voltage ($V_{DCLink}/2$ for HMMC) on the DC side is a function of the $\sqrt{2}$. More specifically, $V_{DCLink} \geq 2\sqrt{2} \, (V_{Phase})$.

Accordingly, implementing the SMs 750 with full-bridges offers a significant range of features on the DC side, including the capability of two-way blocking (i.e., the ability to isolate the DC side from the AC side through the SMs 750). For example, if a short circuit occurs on the DC side, blocking is needed to prevent the DC side short circuit from also taking down the AC side.

The various embodiments of the disclosure enable truly variable DC link voltage levels, especially levels lower than voltages on the AC side. The various embodiments may include one or more of: using FB-SMs made of Si IGBTs or SiC MOSFETs; providing two-way blocking IGBTs; replacing only a percentage of the SMs vs. traditional MMCs, but with the same or better power quality; providing embedded isolation protection of AC side in case of DC link short circuit; and reducing volume, lower weight, and reduce costs with equivalent or better power quality performance than traditional MMCs.

For applications that require the DC link voltage being variable and lower than the AC input voltage, for example the case of an active front end (AFE) converter interfacing with an AC motor drive/inverter, conventional MMCs will not work. Such applications are accommodated in the various embodiments of the disclosure.

Additionally, the embodiments can reduce volume and weight by more than around 30%, semiconductor loss in the neighborhood of 30%, cost of SM capacitors by roughly 50%, and cost of IGBTs by 25%. These numbers, and similar numbers below, are merely rough estimates and not intended to represent specific limits or limitations of the embodiments. At the same time, the embodiments can maintain the same, or improved, power quality performance compared with the traditional MMC technology.

Further, HMMCs constructed in accordance with the embodiments offer several distinct advantages over conventional approaches, including the following:

(a) Variable DC link voltage: higher or lower than AC input voltage;
(b) Reduced number of SMs by half, reduced size and weight, and cost savings;
(c) High Power quality, equivalent to traditional MMC with twice the number of SMs;
(d) Same or similar number of conversion levels as the traditional MMC but having half of the number of SMs and having equivalent or better power quality;

(e) Half of the DC link voltage (0.5 Vdc) for the SMs, enabling lower rated devices and module; 2.5 kV, 3.3 kV or 4.5 kV Si IGBTs or SiC MOSFETs; combined MMC advantages;

(f) Only showing one pair of blocking IGBTs and diodes. Can be added (e.g. xn) if more (n number of switches) is needed;

(g) 32.5% total volume reduction (25% due to 50% of the SM capacitors (~50% of the total SM volume), i.e. 25%=50%*50%), and 12.5% due to 25% of the 50% of the IGBTs and gate drivers which are about 50% of the total SM volume, i.e. 12.5%=25%*50%);

(h) 50% cost reduction of the SM capacitor cost, 25% cost reduction of the IGBT cost, compared with traditional MMC with full-bridge SMs;

(i) Reduced semiconductor conduction loss (~30%) and improved efficiency due to fewer number of SMs;

(j) Reduced capacitance (capacitor size) for the DC link capacitors. Serve as communication capacitors only;

(k) IGBTs switching at low line frequency (50 Hz or 60 Hz), less loss, more efficient, and more reliable;

(l) Potential elimination of snubber caps for the IGBTs since low (fundamental AC) frequency switching;

(m) Stacking up more IGBTs for higher voltages is less of an issue . . . more scalable for higher voltage applications; and (n) AC isolation from DC in case of DC short-circuit fault—static switch due to FB-SM.

The various embodiments may include HMMCs based on one or more features including built on a 3-level NPP topology with FB-SM IGBTs and one or more same polarity IGBTs in series; FB-SM MOSFETs and one or more same polarity IGBTs in series; with FB-SM IGBTs and one or more same polarity MOSFETs in series; with FB-SM MOSFETs and one or more same polarity MOSFETs in series; with FB-SM IGBTs and two-way blocking IGBTs; with FB-SM MOSFETs and two-way blocking IGBTs; with HFB-SM Diode and Si IGBTs and two-way blocking IGBTs; with HFB-SM (Diode and SiC MOSFETs) and two-way blocking IGBTs; with HB-SM (Diode and Si IGBTs) and two-way blocking IGBTs; or with HB-SM (Diode and SiC MOSFET) and two-way blocking IGBTs.

The embodiments may also include HMMCs based on HMMC based-on 3L-NPP with HB-SM (Diode and Si IGBTs) and two-way blocking MOSFETs) with HB-SM (Diode and SiC MOSFET) and two-way blocking MOSFETs; with FB-SM IGBTs and two-way blocking IGBTs with neutral point pilot switch of Si IGBT; with FB-SM IGBTs and two-way blocking IGBTs with neutral point pilot switch of SiC MOSFET; with FB-SM MOSFETs and two-way blocking IGBTs with neutral point pilot switch of Si IGBT; of with FB-SM MOSFETs and two-way blocking IGBTs with neutral point pilot switch of SiC MOSFETs.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What I claim is:

1. A hybrid modular multilevel converter (HMMC) based on a neutral point pilot topology (NPP) and having an ABC N-phase structure, comprising N pairs of identical upper and lower arms, each upper and lower arm being composed of X submodules, each submodule being a full-bridge or half-bridge converter with a smoothing capacitor, and Y sets of switches external to the submodules, wherein the switches within each set are cascaded and connected in series.

2. The HMMC of claim 1, wherein each of the submodules is formed of full-bridge silicon (Si) insulated-gate bipolar transistor (IGBT) converters; and
wherein at least one of the set of switches is formed of IGBTs of opposite polarities.

3. The HMMC of claim 1, wherein each of the submodules is formed of half-bridge silicon (Si) insulated-gate bipolar transistor (IGBT) converters; and
wherein the switches within each of the Y set of switches is formed of IGBTs of opposite polarities.

4. The HMMC of claim 1, further comprising positive and negative direct current (DC) voltage rails, a neutral point node, and N AC terminals (i) forming an AC side and (ii) respectively connected to the N pairs of upper and lower arms;
wherein the upper arms are connected between the positive rail and the neutral point node, the lower arms being connected between the negative rail and the neutral point node.

5. The HMMC of claim 4, wherein the positive and negative DC rails respectively form respective terminals on a DC side of the HMMC; and
wherein the X submodules are configured to isolate the DC side from the AC side.

6. The HMMC of claim 5, wherein Phase to neutral voltage values can be lower or higher than DC link voltage values.

7. A hybrid modular multilevel converter (HMMC) based on a neutral point pilot (NPP) topology and having positive and negative direct current (DC) voltage rails, a neutral point node, and a plurality of phase legs each (i) corresponding to an alternating current (AC) phase and (ii) including an upper arm and a lower arm, each upper arm being connected between the positive rail and the neutral point node, each lower arm being connected between the negative rail and the neutral point node, at least one of the upper and lower arms comprising:
two or more series connected submodules having a first lead connected, at least indirectly, to the positive rail and a second lead connected to an output terminal of the corresponding AC phase, each of the submodules being a full-bridge or half-bridge converter with a smoothing capacitor; and
a first set of cascaded switches connected in series and having (i) one end connected to the output terminal and (ii) another end connected to the neutral point node, the first set of cascaded switches being external to the submodules.

8. The HMMC of claim 7, wherein the output terminal includes (i) one end configured for connection to an AC source/input and (ii) another end connected to its corresponding phase leg.

9. The HMMC of claim 8, further comprising a second set of cascaded switches connected in series between the positive rail and the two or more series connected submodules.

10. The HMMC of claim 9, wherein each of the submodules are formed of full-bridge silicon (Si) insulated-gate bipolar transistor (IGBT) converters; and
wherein the first set of switches is formed of IGBTs of opposite polarities.

11. The HMMC of claim 10, wherein the first set of switches are two-way blocking IGBTs.

12. The HMMC of claim 11, wherein the first set of switches are formed of free-wheeling diodes.

13. The HMMC of claim 12, further comprising a first capacitor having one end coupled to the positive rail and another end coupled to the neutral point and a second capacitor having one end coupled to the negative rail and another end coupled to the neutral point.

14. The HMMC of claim 9, wherein each of the submodules are formed of full-bridge silicon carbide (SiC) metal oxide semiconductor field effect transistor (MOSFET) converters; and
wherein the first and second set of switches are formed of diodes and SiC MOSFETs of opposite polarities.

15. The HMMC of claim 7, wherein the diodes are freewheeling.

16. The HMMC of claim 9, wherein each of the submodules are formed of half-bridge Si IGBT converters; and
wherein the first and second set of switches are formed of diodes and Si IGBTs of opposite polarities.

17. The HMMC of claim 9, wherein the diodes are freewheeling.

18. The HMMC of claim 7, wherein line to line voltage values can be lower or higher than DC link voltage values.

19. A hybrid modular multilevel converter (HMMC) based on a neutral point pilot (NPP) topology and having an ABC N-phase structure, comprising N pairs of identical upper and lower arms, each upper and lower arm being composed of X submodules and Y sets of switches;
wherein the switches within each set are cascaded and connected in series and (ii) external to the submodules;
wherein each of the submodules is formed of full-bridge silicon (Si) insulated-gate bipolar transistor (IGBT) converters and a smoothing capacitor; and
wherein at least one of the set of switches is formed of IGBTs of opposite polarities.

* * * * *